June 18, 1935.　　　N. C. RUBIN　　　2,005,052
CUT-OFF MACHINE
Filed May 27, 1933　　　6 Sheets-Sheet 1

INVENTOR
NORBERT C. RUBIN
BY George V. Woodling
ATTORNEY

June 18, 1935.  N. C. RUBIN  2,005,052
CUT-OFF MACHINE
Filed May 27, 1933  6 Sheets-Sheet 2

INVENTOR
NORBERT C. RUBIN
BY George V. Woodling
ATTORNEY

June 18, 1935.  N. C. RUBIN  2,005,052
CUT-OFF MACHINE
Filed May 27, 1933   6 Sheets-Sheet 3

INVENTOR
NORBERT C. RUBIN
BY
George V. Woodling
ATTORNEY

June 18, 1935.  N. C. RUBIN  2,005,052

CUT-OFF MACHINE

Filed May 27, 1933  6 Sheets-Sheet 4

INVENTOR
NORBERT C. RUBIN
BY George V. Woodling
ATTORNEY

June 18, 1935.  N. C. RUBIN  2,005,052
CUT-OFF MACHINE
Filed May 27, 1933  6 Sheets-Sheet 5

INVENTOR
NORBERT C. RUBIN
BY George V. Woodling
ATTORNEY

Fig 15

Patented June 18, 1935

2,005,052

UNITED STATES PATENT OFFICE 2,005,052

CUT-OFF MACHINE

Norbert C. Rubin, Cleveland, Ohio, assignor to The McKinney Tool and Manufacturing Company, Cleveland, Ohio, a corporation of Ohio Application May 27, 1933, Serial No. 673,133

19 Claims. (Cl. 29—69)

My invention relates to cut-off mechanisms and more in particular to a high speed saw cut-off.

The present method of cutting off relatively wide sections of material is to place the material beneath a driven saw which is mounted on the end of a beam hung from the ceiling of the room and manually draw the saw through the material. Sometimes this beam is hung from a bracket formed on the saw bed. An object of my invention is to provide a saw mechanism which supports a saw above the material to be cut off and which, at the will of the operator, lowers the saw into working engagement with the material, forces the saw laterally through the material, then raises the saw out of working engagement with the material and returns the saw to its elevated initial position.

If such a saw were attached to the end of a roll forming machine to cut off pieces of the sections rolled therein, it would be desirable to vary the speed of travel of the saw through the material. It is obvious to all who are familiar with the art that various thicknesses and types of material require various speeds of travel of the saw through the material to obtain greater length of life for the saw blade. Therefore I provide an adjustable drive for the mechanism which drives the saw through the material and thereby form another object of my invention.

A desirable application for a cut-off machine such as I have described in my first object is to have it located between the end of a cold roll forming machine and a run-out table provided to support the portion of the formed material projecting from the roll forming machine. As another object of my invention, I provide a trigger adjustably mounted in the path of the material on the run-out table so that as the material contacts the trigger, the movement imparted to said trigger actuates a control which stops the roll forming machine and arrests the travel of the material being formed therein, at which time the operator operates the saw and cuts off a desired length of the formed material.

While employing the saw in this manner the operator may find that the lengths of the material being cut off are not as accurate as desired. To correct this condition I mount the saw in an adjustable relationship with the trigger on the run-out table and by means of an indicator, a reasonable tolerance can be maintained in the lengths of the material being cut-off. This forms another object of my invention.

Further objects and advantages of my invention will be apparent from the following detailed description and illustrations in which.

Figure 1:
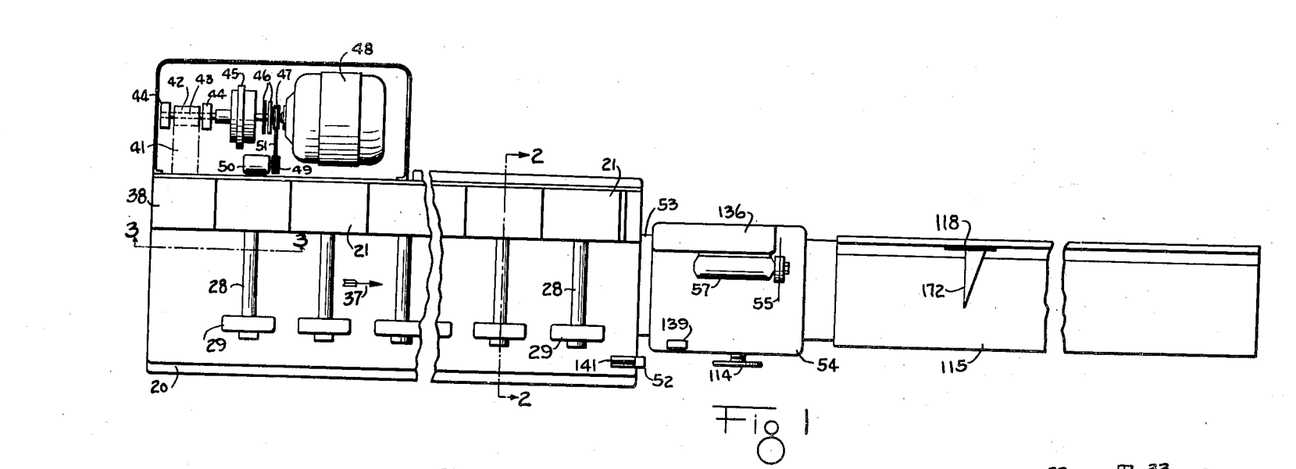
Figure 1 is a plan view of a roll forming machine with its motor, its clutch and transmission, the saw and its controls and the run-out table and its associated trigger.
Figure 2:
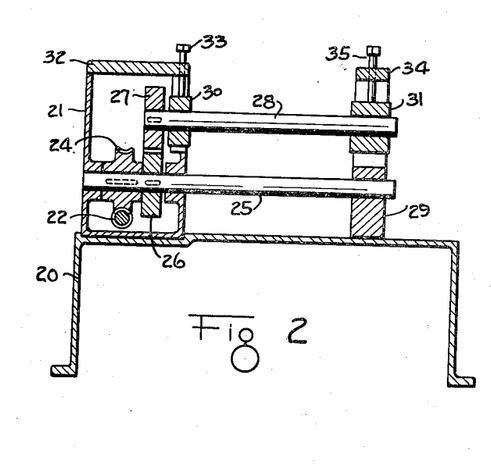
Figure 2 is a partial sectional view across the line 2—2 Figure 1.
Figure 3:
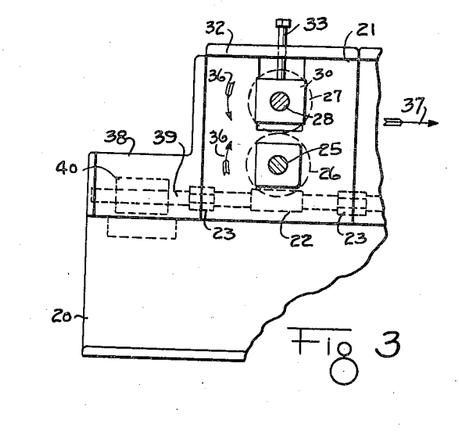
Figure 3 is a partial elevational view taken along the line 3—3 Figure 1.
Figures 4, 5:
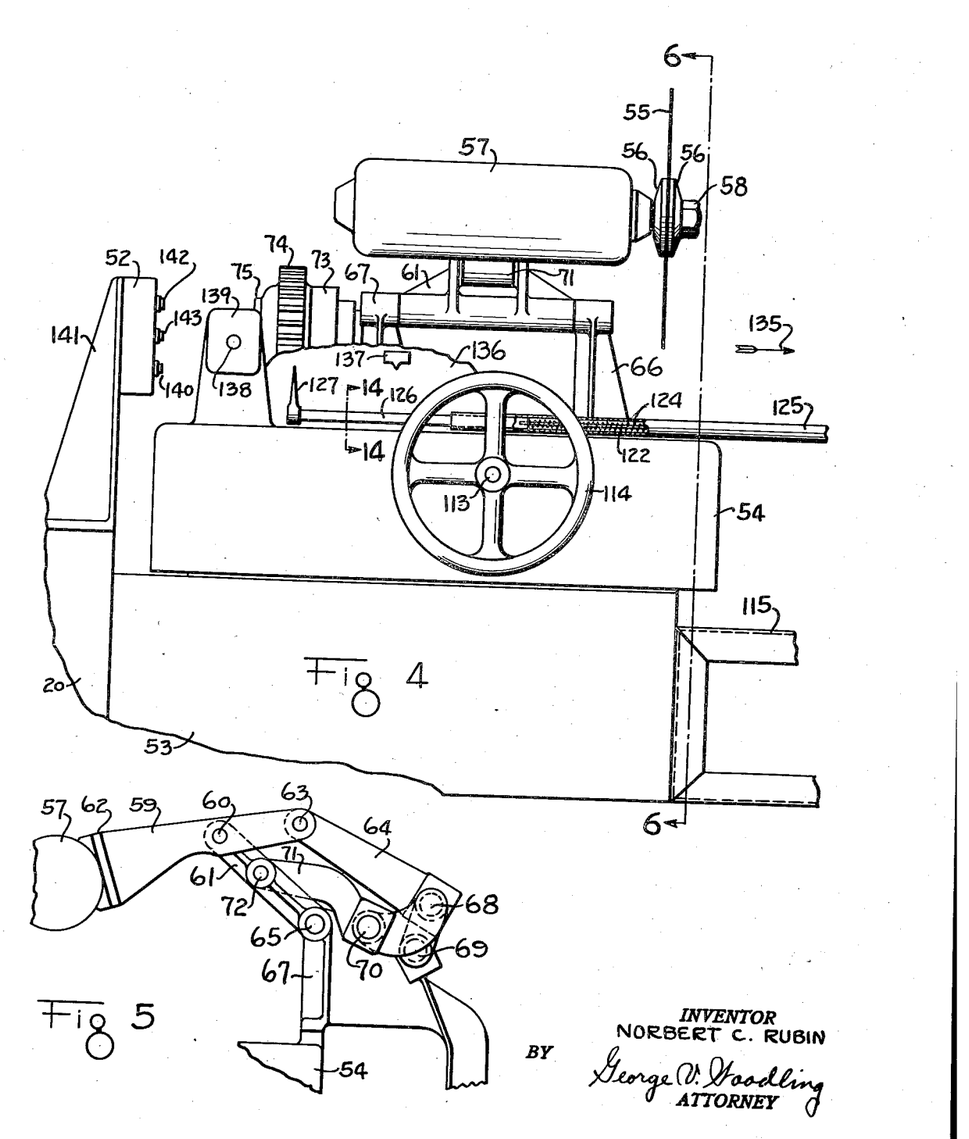
Figure 4 is a front elevational view of the cut-off saw showing a portion of the roll forming machine and a portion of the run-out table.
Figure 5 is a partial sectional view of the cranks and linkage arrangement showing the saw in a different operative position from that shown in Figure 6.

In the accompanying drawings which serve to illustrate my invention, the reference character 20, (see Figures 1, 2 and 3) designates the bed of a roll forming machine. Mounted thereon and adjacent to each other are a series of rear housings 21, carrying internally for rotation a worm 22. Fixed to the extreme ends of each worm shaft 22, is a coupling 23 also keyed to the end of the adjacent worm shaft. Meshing with the worm 22, is a worm gear 24, keyed to the bottom spindle 25, which is also mounted for rotation in the rear housing 21. Keyed to the bottom spindle 25, between the worm gear 24 and the front wall of the rear housing 21, is a spur gear 26, having engaged with it in driven relation, another spur gear 27, fixed to the top spindle 28. Projecting from the rear housing 21, the bottom spindle 25 terminates in a bearing in the outboard housing 29. Adjacent the spur gear 27, the top spindle 28 is carried for rotation in the bearing box 30, slidably mounted in ways in the rear housing 21. Extending through the bearing box 30, the top spindle 28, also terminates in another bearing box 31, slidably mounted in the outboard housing 29. Located in a top plate 32, which is suitably fastened to the rear housing 21, is a screw 33, having threaded engagement therein and extending downwardly to contact and locate the bearing box 30. Another top plate 34, which is suitably fastened to the outboard housing 29, also contains a screw 35, having threaded engagement therein and extending downwardly to contact and locate the bearing box 31. It is now apparent that when the worm 22 is rotated, the worm gear 24 and its associated bottom spindle 25 also rotates and through the medium of the spur gears 26 and 27, the top spindle 28 rotates. It is also evident that if rolls were placed and keyed on the top and bottom spindles and were rotated in the direction designated by the arrows 36, any material interposed between said rolls would be driven in the direction designated by the arrow 37.

Adjacent to the first rear housing 21, is located a sprocket housing 38, supporting for rotation a shaft 39 having keyed thereon a sprocket 40. Engaging the end of the shaft 39, and the adjacent worm shaft 22, is a coupling 23. A chain belt 41, carried at one end by the sprocket 40, is supported at its other end by another sprocket 42, which is keyed to a shaft 43. Supporting the shaft 43, are two pillow blocks 44, through one of which, the shaft 43 extends and terminates in the driven half of a magnetic clutch 45. For purposes of illustration I show the driven half of the clutch 45, its associated collector rings 46, and a belt sheave 47, mounted on the shaft of an electric motor 48, although an ordinary counter shaft could be used to replace the motor shaft, said countershaft being engaged with a line shaft by means of a coupling or a belt drive. Connecting the belt sheave 47, and another belt sheave 49, which is keyed to the shaft of a direct current generator 50, is a belt 51. It is apparent that as the shaft of the motor 48, is rotated the belt sheave 47, and the driver half of the clutch 45, with its associated collector rings 46, also rotate. By virtue of the belt 51, imparting rotation to the belt sheave 49, the armature of the generator 50, rotates and generates the required amount of direct current. I do not further describe the electrical wiring relation between the generator 50 and the magnetic clutch 45, as it is very evident to all who are familiar with this art. It is also obvious that as the magnetic clutch 45, is engaged, by means of an electrical control contained in the switch box 52, rotation of the motor shaft is imparted to the shaft 43 and its associated sprocket 42. Likewise the sprocket 40, is rotated by virtue of the chain 41. As hereinbefore described, the worm shaft 22 is rotated and likewise the associated roll spindles 25 and 26 rotate.

Figure 6:
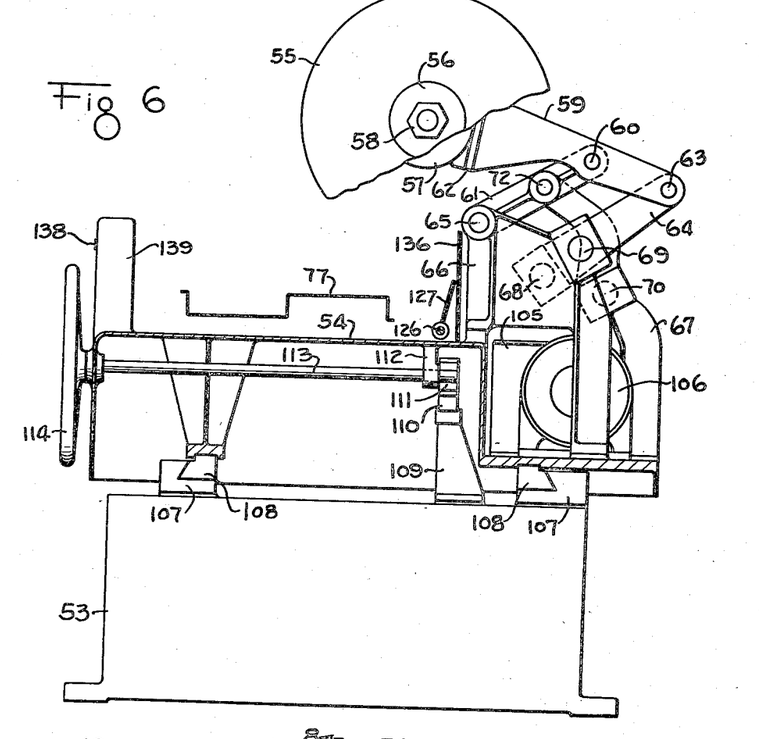
Figure 6 is a partial sectional view taken across the line 6—6 Figure 4.
Figure 7:
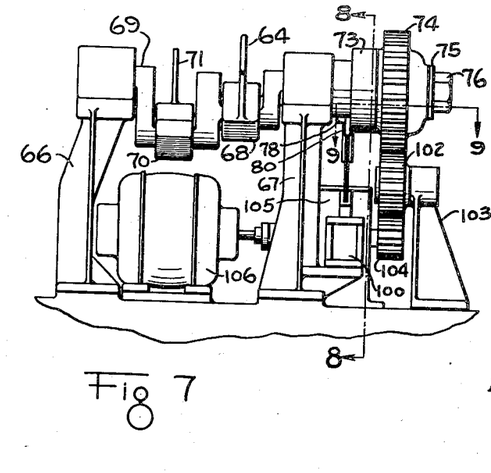
Figure 7 is a rear elevational view showing a portion of the saw operating mechanism.
Figure 8:
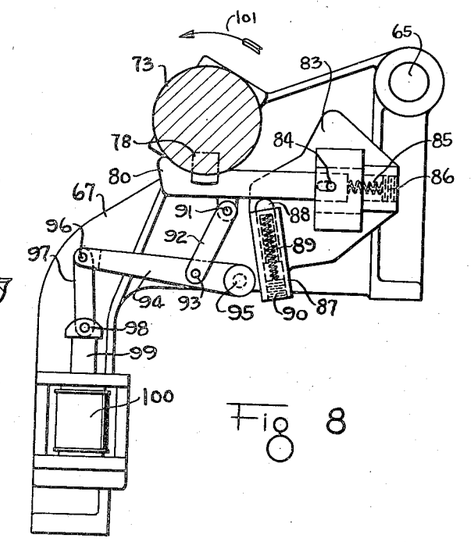
Figure 8 is a partial view taken along the line 8—8 Figure 7.
Figure 9:
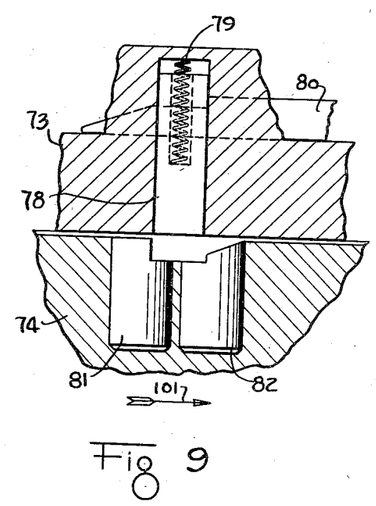
Figure 9 is a partial sectional view along the line 9—9 Figure 7.
Figure 10:
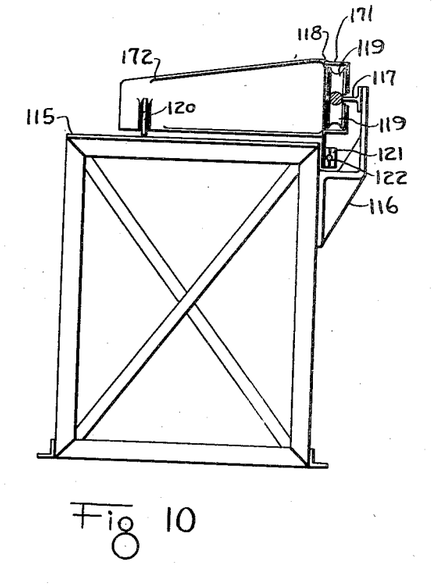
Figure 10 is an end view of the run-out table showing the trigger mounting.
Figure 11:
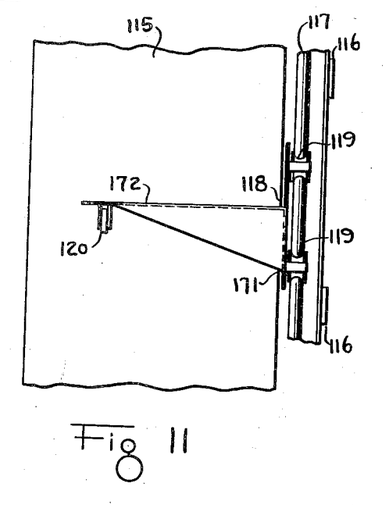
Figure 11 is a partial view of the trigger and run-out table.
Figure 12:
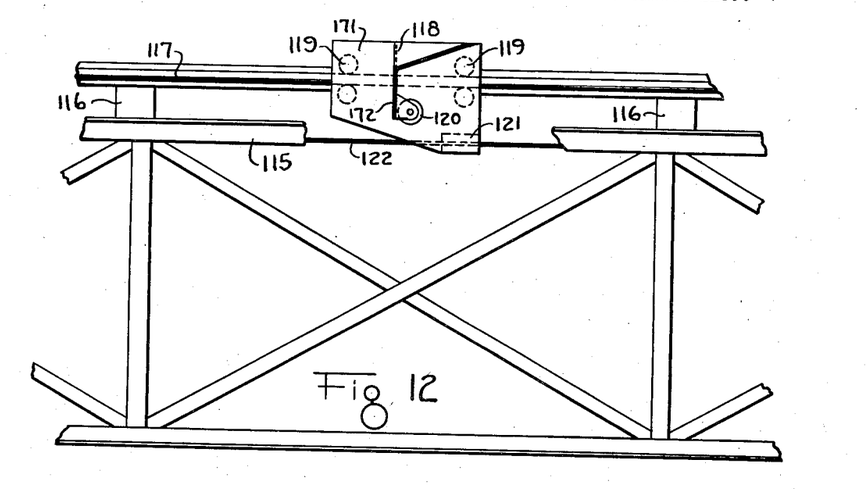
Figure 12 is a partial elevational view of the run-out table showing the trigger and rod mounting.
Figures 13, 14:
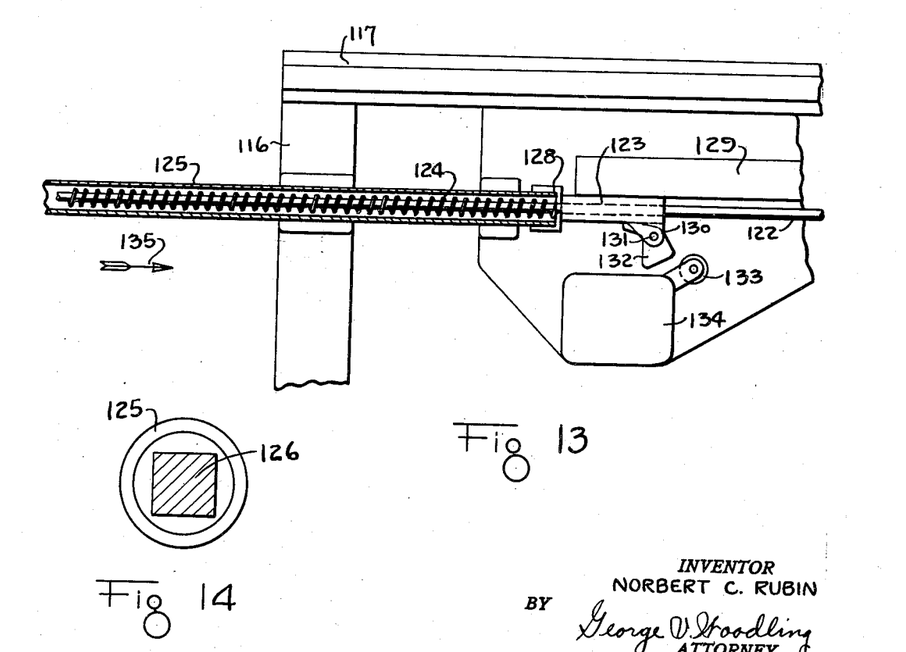
Figure 13 is a partial elevational view of the trigger rod mounting on the run-out table and the limit switch with its control.
Figure 14 is a partial sectional view taken along the line 14—14 Figure 4.

Located at the exit end of the roll forming machine is a high speed cut-off saw, (see Figures 1, 4, 5, 6, and 7) comprising a bed 53, and a saw carriage 54. The saw blade 55, is located between two clamping washers 56, on the shaft of an electrical motor 57, and retained thereon by a nut 58, having threaded engagement with the end of the motor shaft. Supporting the motor 57, in a plate 62, having formed thereon, and extending rearwardly, a bifurcated lever 59, mounted intermediate its ends on a pin 60, which is carried in the upper end of another bifurcated lever 61, located in the bifurcation formed in the lever 59. The opposite end of the bifurcated lever 59, carries both ends of a pin 63, the center of which bears in one end of a lever 64. Supporting the lower end of the lever 61, is a pin 65, having one of its ends fixed in a bracket 66, and its other end fixed in another bracket 67. Lever 64, extending downwardly from the pin 63, terminates in a bearing on a crank 68, formed on the crankshaft 69. Another crank 70, formed on the crankshaft 69, suitably carries one end of a lever 71, having its opposite end mounted on the center of a pin 72, located intermediate the ends of, and in the bifurcation formed in, the lever 61, which carries both ends of the pin 72. The brackets 66 and 67, located on either side of the cranks 68 and 70, serve to support the crankshaft 69, which extending beyond the bracket 67, has formed thereon a flange 73. Continuing beyond the flange 73, the crankshaft 69, extends through a spur gear 74, a washer 75, and terminates in a threaded portion which engages a nut 76, to retain the spur gear and washer thereon, said spur gear being mounted thereon for rotation. Upon rotating the crankshaft 69, one revolution, beginning from approximately the position shown in Figure 6, the electrical motor 57, and its associated saw blade 55, are first lowered for a distance, then moved outwardly, then upwardly and returned in an arcuate manner to the initial position. By way of illustration I have shown in Figure 6, a relatively wide section of formed sheet metal 77, in position to be cut off by the saw 55. It is obvious that the saw blade 55, in performing the working cycle just described, is lowered into cutting engagement with the stock 77, then forced outwardly through the stock, then retrieved from the stock and returned to its initial position. This arrangement of cranks and links and the motion resulting from the rotation therein is more fully described and illustrated in my co-pending patent application Serial No. 666,337. Slidably mounted in the flange 73, on the crankshaft 69, is a block 78, (Figures 7, 8, and 9) one end of which has a hole drilled therein, against the bottom of which rests one end of a compression spring 79, having its opposite end bearing against a provided wall in the flange 73. The block 78 is normally located in the flange 73, in such a manner that its opposite end is flush with the face of the flange 73. In this manner it is retained by a blade 80, engaging the block 78, in a provided groove in the bottom of the said block. In the face of the gear 74, which bears against the flange 73, is a plurality of pairs of pins 81 and 82, having their outward extremities located a slight distance away from the face of the flange 73. The pin 81, has a shoulder formed in its outward end facing a similar shoulder formed on the end of the pin 82, except that the face formed by the shoulder on the pin 82 is bi-sected by the end of said pin tapering inwardly from its outward extremity. It is apparent that when the blade 80, is removed from its associated groove in the block 78, the block 78 is moved towards the gear 74, by virtue of the compression spring 79, behind the block, where it is engaged by the shoulders on the pins 81, and 82, locking the flange 73 with the gear 74. It is then obvious that, with the block 78 in this position, when the gear 74 rotates, the flange 73 and the crankshaft 69 likewise rotate.

Extending rearwardly from the block 78, the blade 80, terminates in a hole formed in a bracket 83, which is suitably fastened to the bracket 67. Formed in the end of the blade 80, is an elongated hole through which is passed a pin 84 having both of its ends fixed in the bracket 83. Bearing against the same end of the blade 80, is one end of a compression spring 85, having its opposite end located against a plug 86, which has threaded engagement with the bracket 83. Formed on the bracket 83, adjacent to the crankshaft and beneath the blade 80, is a lug 87, having slidably contained therein a plunger 88 with its one end bearing against the under side of the blade 80. Formed in the opposite end of the plunger 88 is a hole, against the end of which bears a compression spring 89 having its opposite end located against a plug 90 which has threaded engagement with the lug 87. Thus it is evident that by virtue of the compression spring 89 bearing against the plug 90, the plunger 88 is forced upwardly against the blade 80. Therefore, as the blade 80 is pivoted about the pin 84, its opposite end is brought to bear against the flange 73, thus locating the sliding block 78 in its previously described withdrawn position.

Formed on the underside of the blade 80, adjacent the plunger 88, is a lug, having fixed therein and extending on either side thereof, a pin 91. Located on either side of said lug and mounted on the ends of the pin 91 are the ends of a pair of links 92, the opposite ends of which are carried on the ends of another pin 93 fixed in, and intermediate the ends of, another lever 94. Adjacent the pin 93, the lever 94 terminates around a pin 95 upon which it is carried for rocking movement. The opposite end of the lever 94 terminates in a clevised portion and has fixed therein both ends of a pin 96, the center of which supports one end of a link 97, having its opposite end mounted around a pin 98 which is fixed in the bifurcated upper end of a plunger 99 of an associated ordinary electrical solenoid 100. It is now apparent that the spring 89 and plunger 88 serve to maintain the upward positions of the blade 80, the links 92, 94 and 97, and the plunger 99. Therefore, as the solenoid 100 is energized, its associated plunger 99 is drawn downwardly and by virtue of the links 97, 94 and 92, the blade 80 is also drawn downwardly and out of engagement with the sliding block 78, allowing it to be pushed forward by the compression spring 79. Likewise then, it is also apparent that as the gear 74, with its component pins 81 and 82, is rotated in the direction designated by the arrow 101, (Figures 8 and 9) the sliding block 78 engages the first pair of pins, 81 and 82, with which it comes in contact, and rotation is imparted to the crankshaft 69 and its associated cranks 68 and 70, resulting in the previously described, desired operating movement of the motor 57 and its associated saw blade 55.

Meshing with the gear 74, is an idler gear 102, supported for rotation by the bracket 103 which is suitably fastened to the carriage 54. Engaging in driving relation with the idler gear 102, is a pinion 104, fixed to the out-put shaft of a speed reducer 105, the input shaft of which is coupled to the shaft of an electrical motor 106. It is evident that as the motor 106 is rotated, the gear 74 also rotates by virtue of the speed reducer 105 and the gears 104 and 102. While I have illustrated a gear train, a speed reducer and an electrical motor to rotate the gear 74, I wish it understood that this arrangement is merely illustrative of a typical embodiment of my invention and not by way of limitation or narrowing of the appended claims.

I also wish it understood that I have contemplated the replacement of the illustrated speed reducer 105 with a variable speed reducer, the utilization of which obviates the ability to vary the speed of the saw through the stock.

Beneath the saw carriage 54, and fixed to the top of the saw bed 53, is a pair of ways 107, having mounted for reciprocation therein a pair of gibs 108, which are suitably fastened to the saw carriage 54. Also fixed to the top of the saw bed 53, is a bracket 109, extending upwardly from the bed and having fixed on its top surface, a rack 110, which is meshed with a pinion 111. Adjacent the pinion 111, and extending downwardly from the saw carriage 54, is a lug 112, supporting for rotation, one end of a shaft 113, to which the pinion 111 is keyed. Extending outwardly, the shaft 113 passes through a boss in the carriage 54 and immediately terminates in the hub of a handwheel 114, to which it is keyed. It is now obvious that as the handwheel 114 is rotated, the carriage 54 reciprocates by medium of the pinion 111 meshing with the rack 110. The purpose of this reciprocating means will be more fully hereinafter described.

Fixed to the end of the saw bed 53, is one end of a run out table 115, (see Figures 1, 4, 10, 11, and 12) comprising a frame of conventional structural iron work welded together with a flat, tabular surface extending the full length and width of the structure. Fixed on the rearward side of the table 115, is a plurality of brackets 116, extending to one side, and above the surface, of the table. Suitably fastened to the top of the inner surface of the brackets 116, is a track 117, having mounted thereon a trigger carriage 118, comprising two pairs of rollers 119 which are supported by pins fixed in a member 171 of the trigger carriage which extends in a parallel relation to the table 115 and track 117. Extending over the table top 115, and perpendicular to said member of the trigger carriage 118, is a second member 172 having located at its outer end a roller 120, suitably mounted thereon and provided to roll on said table top and support the said second member. Extending downwardly and on the rearward side of the table 115, the first mentioned member 171 of the trigger carriage 118 terminates in a split block 121, through which passes a trigger rod 122, clamped in the split block by screws, (not shown) said trigger rod being located in a parallel relation with the track 117. It is evident that the trigger carriage is free to roll along the run-out table upon its associated rollers 119 and 120, and the trigger rod 122 which is clamped in the split block 121 is also carried along with the carriage 118. Projecting from either end of the split block 121, one end of the trigger rod 122 terminates at the far end of the run-out table 115, while the opposite end passes through a block 123, a spring 124, a tube 125, and terminates in one end of a square rod 126, wherein it is fixed. (Figures 4, 12, 13, and 14). The tube 125, which is fixed to the end of the run-out table 115, extends forwardly over the saw carriage 54, and terminates in a portion containing a square bearing through which passes the square rod 126. Extending beyond the tube 125, the square rod 126 terminates in a round portion upon which is fixed a pointer 127 extending upwardly from the rod. Bearing against the opposite end of the square rod 126, which terminates in the bearing in the tube 125, and has fixed therein the end of the trigger rod 122, is one end of the compression spring 124, the opposite end of which bears against a cap 128 located at the opposite end of the tube 125 and having threaded engagement thereon. Adjacent to the cap 128, is the block 123 which is fixed to the trigger rod 122 and slides against a bearing strip 129 fixed to the run-out table 115 immediately above the block 123. Extending downwardly from the block 123 and formed thereon is a pair of lugs 130 carrying both ends of a pin 131 upon the center of which is mounted for rocking movement a latch 132. Extending downwardly from the pin 131, the latch 132 terminates in an angular cam face, while, extending outwardly from the pin the latch terminates in a portion bearing against the underside of the block 123, said portion serves to retain the latch 132 in the proper position as gravity affects the cam portion of the latch. Also mounted on the run-out table 115, with its operating roller 133 in co-acting relation with the cam face of the latch 132, is a normally closed limit switch 134, connected in series with the circuit controlling the magnetic clutch 45. The wiring of said switch will be hereinafter disclosed. It is now obvious that as the trigger rod 122 is moved in the direction designated by the arrow 135, Figs. 4 and 13, the block 123 with its associated latch 132 likewise move in the same direction and actuate or open the normally closed limit switch 134. In a similar manner the spring 124 is compressed and the square rod 126 with its associated pointer 127 also move in the same direction. Partially shown covering the crank and link mechanism, (Figures 4 and 6) is a guard 136, serving to house said mechanism. Mounted on the guard 136, and in co-acting relation with the pointer 127, is an indicator 137.

It is now apparent that as a section of stock formed in the roll forming machine advances from the machine and passes beneath the saw 55, it continues to travel upon the run-out table 115, until it contacts the trigger member 172, which is pushed along by the stock. Immediately upon moving the trigger carriage 118 and its associated rod 122, the limit switch 134 is actuated which causes the magnetic clutch 45 to be disengaged, and the arrest of the travel of the stock through the roll forming machine. Also, the pointer 127, is moved in the direction of travel of the stock, until such movement is stopped, at which time the operator aligns the pointer 127 and the indicator 137 by employing the handwheel 114 with its associated rack and pinion. The saw is now in position to cut off the stock. This is done by actuating or depressing a normally open push button type switch 138, mounted in a tower 139 formed on the carriage 54, said switch energizing the previously mentioned solenoid 100 which trips the clutch and rotates the crankshaft 63, resulting in the desired operating movement of the saw 55. Upon removing the severed piece of stock from the run-out table, it is evident that the spring 124 will return the trigger 118 and the pointer 127 to their initial positions. Obviously, as this operation is repeated, the lengths of stock cut off do not vary and a very close tolerance is maintained. After the present piece of stock has been cut off, the roll forming machine may be restarted by depressing the normally open push button type switch 140, located in the switch box 52 which is mounted on a bracket 141 suitably fastened to the bed 20 of the roll forming machine, said switch being connected in series with the magnetic clutch circuit, which is more fully hereinafter described. Also located in the switch box 52 is a normally closed push button type switch 142 which serves to disengage the magnetic clutch and stop the roll forming machine. A third push button switch 143 of the normally closed type, also located in the switch box 52, is utilized as an inch control for the roll forming machine and is advantageous for making adjustments in the machine.

Figure 15:
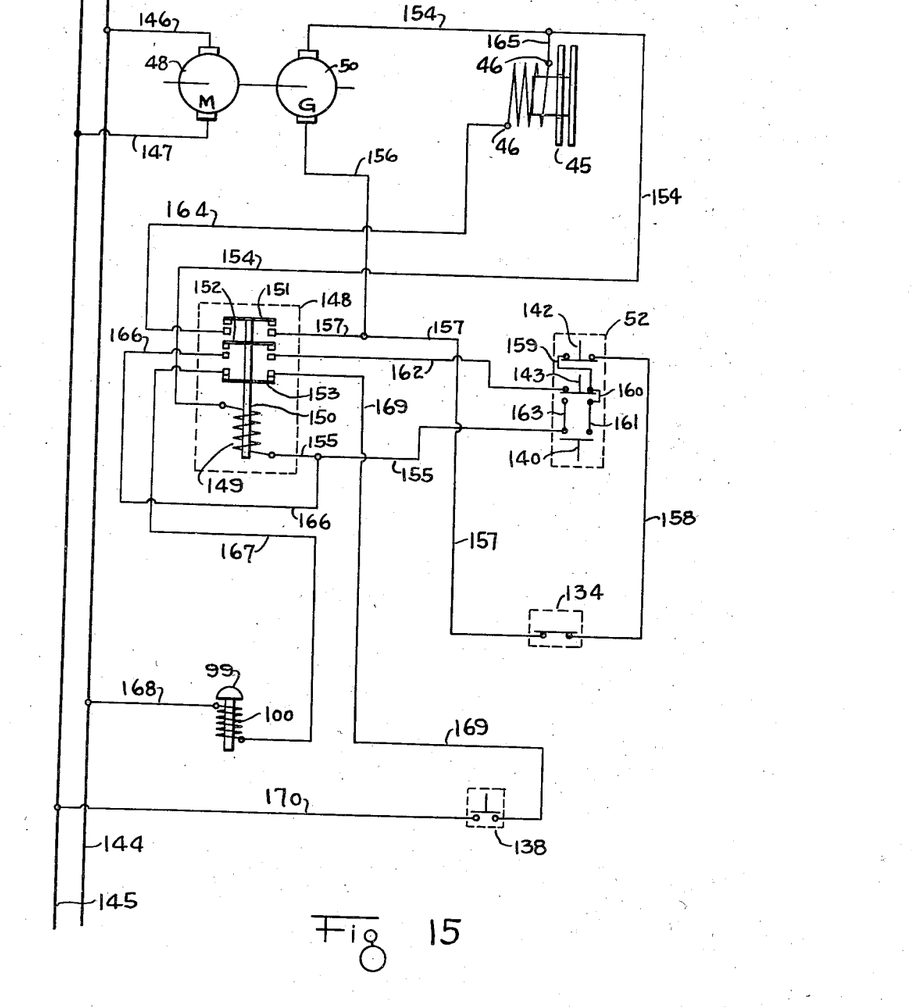
Figure 15 is an electrical circuit diagram showing the method of wiring the roll forming and cut-off machines with their respective controls.

In Fig. 15, which represents a circuit diagram for the roll forming machine and its respective controls, I designate the conductors coming from a conventional source of alternating current by the numerals 144 and 145. Connecting one pole of the electrical motor 48 to the conductor 144, is another conductor 146, and the other pole of the motor is connected to the conductor 145 by another conductor 147. Although I have not shown a motor starter, I wish it understood that a conventional starting arrangement may be employed to start the motor 48. Also located in the machine, though not previously described, is a contact 148, containing an electrical control apparatus which comprises a magnetic coil 149, a core 150, a normally open contact 151, another normally open contact 152 and a normally closed contact 153. Connecting one pole of the generator 50 and one contact on the magnetic coil 149, is a conductor 154, and another conductor 155 connects the other contact on the coil 149 to one contact of the push button switch 140. Extending from the other pole of the generator 50, is a conductor 156 which terminates in a spliced engagement with another conductor 157, having its one end fastened to one terminal of the contact 151 and its opposite end is secured to one contact of the normally closed limit switch 134. Another conductor 158 connects the opposite contact of the switch 134 to one contact of the push button switch 142, the opposite contact of which is connected to one of the normally closed terminals of the four contact push button switch 143 by a conductor 159. The same terminal of the switch 143 is connected to its co-acting normally open contact by a conductor 160, said contact being also connected to one terminal of the push button switch 140 by another conductor 161. Extending from the opposite normally closed contact of the switch 143 is a conductor 162, the opposite end of which is secured to a terminal of the contact 152. Connecting the opposite normally open contact of the switch 143 and the other contact of the switch 140, is a conductor 163. Extending from the opposite terminal of the contact 151 is a conductor 164, the opposite end of which contacts one of the collector rings 46 of the magnetic clutch 45, the other collector ring 46 of said magnetic clutch being connected to the conductor 154 by another conductor 165. Another conductor 166, having its one end secured to the other terminal of the contact 152, terminates its opposite end in a spliced engagement with the conductor 155. Connecting one terminal of the contact 153 and one pole of the solenoid coil 100, is a conductor 167, and the other pole of said solenoid coil is connected to the alternating current supply conductor 144 by another conductor 168. Extending from the other terminal of the contact 153, is a conductor 169 having its opposite end secured to one contact of the normally open push button switch 138, the opposite contact of which is connected to the other alternating current supply conductor 145 by another conductor 170. This comprises the circuit diagram to control the typical embodiment of the mechanism herein described.

In order to operate the machine the electrical motor 48 is energized, after which rotation is imparted to the armature of the direct current generator 50. Upon depressing the start button switch 140, direct current flows from the generator 50, through the conductors 156 and 157, the limit switch 134, the conductor 158, the normally closed switch 142, the conductors 159, 160 and 161, the now closed switch 140, the conductor 155, the magnetic coil 149, and returns to the generator through the conductor 154. As the magnetic coil 149 is energized, its associated core 150 is drawn downward which causes the normally open contacts 151 and 152 to be closed and the normally closed contact 153 to be opened. With the contact 152 closed, direct current again flows from the generator through the conductors 156 and 157, the limit switch 134, the conductor 158, the switch 142, the conductor 159, the switch 143, the conductor 162, the now closed contact 152, the conductors 166 and 155, the magnetic coil 149, and returns to the generator through the conductor 154. Thus it is obvious that the push button switch 140 may be released immediately after being depressed and that a circuit will be maintained, causing the magnetic coil 149 to be energized and its component core and contacts to be actuated. As the contact 151 is closed, direct current flows from the generator 50 through the conductors 156 and 157, the now closed contact 151, the conductor 164, the coil of the magnetic clutch 45, causing it to be energized and to engage the clutch, and returns to the generator through the conductors 165 and 154. It is apparent that as the push button switch 142 is depressed, opening its contacts, the circuit between the generator and the magnetic coil 149 is broken and the contacts 151 and 152 are reopened, causing the coil of the magnetic clutch 45 to be de-energized which releases or disengages the clutch. Obviously, as the push button switch 143 is depressed, a circuit will be made, causing the magnetic clutch to be energized, but only as long as the said push button is depressed. Immediately upon its release the circuit is broken which obviates the release of the magnetic clutch. It is also evident that actuation of the normally closed limit switch 134, tends to open any previously made circuit.

As the push button switch 138 is depressed, alternating current flows from the main line 145, through the conductor 170, the switch 138, the conductor 169, the normally closed contact 153, the conductor 167, the magnetic coil 100, causing its associated plunger 99 to be drawn downward, and returns through the conductor 168 to the opposite main line 144. It is apparent that the opening of the normally closed contact 153 causes the magnetic coil 100 to be inoperative. Throughout the description of the electrical circuit I have specified types of switches, controls and current, and I wish it understood that these are merely certain embodiments of my invention and that the mere substitution of these items will not involve any departure from this disclosure.

Although I have herein specified the direction of rotation of the saw driving mechanism and the direction of travel of the saw through its movement, I wish it understood that this was merely for purposes of illustration and that it is obvious that the direction of the said rotation and travel could be reversed without a variation of the associated driving members, such variations being contemplated by me and not involving any departure from the scope of my invention.

I wish it known and understood that the particular mechanism and the various parts thereof illustrated and described are merely a typical embodiment of my invention and that the specific construction described herein is merely by way of illustration and not by limitation or narrowing of my claims.

Obviously various of the features described can be omitted leaving the mechanism still operative to do certain of its work, such changes being contemplated by me and not involving any departure from my invention.

Having thus described my invention, what I claim as new and desire to secure by Letters Patent is:—

1. A cut-off machine comprising a table, a cutting element movably mounted thereon, means to move the element in one transverse direction across the table while in operating relation thereto and to return the element through a reverse transverse direction in an elevated position, the said means comprising a crankshaft having a plurality of differently related cranks, and linkage connecting the cranks with the cutting element.

2. A cut-off machine comprising a table, a rotary cutting element movably mounted thereon, said element having a dwell position, the dwell position having an elevated relation to the table, means to move the element in one transverse direction across the table while in operating relation thereto and to return the element through a reverse transverse direction in an elevated position, the said means acting on the element to accelerate it from and decelerate it to the said dwell position.

3. A cut-off machine comprising a table, a cutting element movably mounted thereon, means to move the element in one transverse direction across the table while in operating relation thereto and to return the element through a reverse transverse direction in an elevated position, said means comprising a crankshaft having a pair of differently related cranks, and linkage connecting the cranks to the cutting element.

4. A cut-off machine comprising a table, a rotary cutting element movably mounted thereon, means to move the said element downward, then transversely across the table, then upward and back to its original position, said means comprising a crankshaft having a plurality of differently related cranks, and linkage connecting the cranks to the cutting element.

5. A cut-off machine comprising a table, a rotary cutting element movably mounted thereon, means to move the said element in one transverse direction across the table and to return the element to its initial position through a reverse transverse direction, the said means comprising a crankshaft having a plurality of differently related cranks, and linkage connecting the cranks to the cutting element.

6. A cut-off machine comprising a table, a rotary cutting element movably mounted thereon, means to move the element in one transverse direction across the table while in operating relation thereto and to return the element through a reverse transverse direction in an elevated position, said means comprising a crankshaft having a plurality of differently related cranks, and linkage connecting the cranks to the cutting element, a source of motive power, a clutch for connecting the above mentioned means to the source of motive power, a solenoid for operating the said clutch, and a switch for controlling the solenoid.

7. A cut-off machine comprising a table, a rotary cutting element movably mounted thereon, means to move the element in a transverse direction across the table, then downward, then in a reverse transverse direction across the table, and then upward to its initial position, said means comprising a crankshaft having a plurality of differently related cranks, and linkage connecting the cranks to the cutting element.

8. A cut-off machine comprising a table, a cutting element movably mounted thereon, means to move the element, said means comprising a crankshaft having a plurality of differently related cranks, and linkage connecting the cranks to the cutting element.

9. In a mechanism of the class described, in combination, a roll forming machine, a cut-off machine located in operating relation to the roll forming machine, the cut-off machine comprising a support, a cutting element movably mounted thereon, means to move the element, said means comprising a crankshaft having a plurality of differently related cranks, and linkage connecting the cranks to the cutting element, and a run-out table located in operating relation to the cut-off machine.

10. A cut-off machine comprising a support, a crankshaft rotatably mounted thereon, said crankshaft having a plurality of cranks, a pivotably mounted member, a link connecting one of the cranks to a pivot intermediate the ends of the said pivotably mounted member, a beam pivotably mounted intermediate its ends on the free end of the said pivotably mounted member, a second link connecting another crank to one end of the beam, and a cutting element fixed to the opposite end of the beam.

11. A cut-off machine comprising a support, a member pivotably mounted thereon, a beam mounted on the said member, a cutting element mounted on one end of the beam, a crankshaft rotatably mounted on the support, a plurality of cranks on the crankshaft, a link connecting one of the cranks to the said member, and a second link connecting another crank to the said beam.

12. In a mechanism of the class described, in combination, a roll forming machine, a cut-off machine located in operating relation to the roll forming machine, the cut-off machine comprising a support, a member pivotably mounted thereon, a beam mounted on the said member, a cutting element mounted on one end of the beam, a crankshaft rotatably mounted on the support, a plurality of cranks on the crankshaft, a link connecting one of the cranks to the said member, and a second link connecting another crank to the said beam, and a run-out table located in operating relation to the cut-off machine.

13. A cut-off machine comprising a support, a cutting element movably mounted thereon, means to move the element, said means comprising a crankshaft having a plurality of differently related cranks and linkage connecting the cranks to the cutting element, a trigger mounted in operating relation to the cutting element, and an indicator mounted on the support to be effected by the actuation of the trigger.

14. A cut-off machine comprising a support, a cutting element movably mounted in non-operative relation to the support, means to move the cutting element through an operative cycle relative to the support, the said means comprising a crankshaft having a plurality of differently related cranks, and mechanism connecting the cranks to the cutting element.

15. A cut-off machine comprising a support, a cutting element movably mounted thereon, a mechanism arranged to move the cutting element through a duty cycle, said mechanism comprising a crankshaft having a plurality of differently related cranks, and means to connect the cranks to the cutting element.

16. A cut-off machine comprising a support, a cutting element suspended above the support, a mechanism arranged to lower and retrieve the cutting element, the said mechanism comprising a crankshaft having a plurality of differently related cranks, and means to connect the cranks to the cutting element.

17. A cut-off machine comprising a support, a cutting element mounted on the support, means to actuate the cutting element, the said means comprising a crankshaft having a plurality of differently related cranks, and mechanism arranged between the cranks and the cutting element.

18. A cut-off machine comprising, in combination, a support, a cutting element mounted in operative relation thereto, the combination of the support and the cutting element being such that one may be moved relative to the other, a crankshaft having a plurality of differently related cranks, and interconnecting linkage adapted to effect the said relative movement.

19. A cut-off machine for cutting off material comprising, in combination, a support for sustaining the material to be cut off, a cutting element co-operatively associated with the support, the combination of the support and the cutting element being such that one may be moved relative to the other, a crankshaft having a plurality of differently related cranks, and mechanism disposed between the crankshaft and the cutting element to effect the said relative movement.

NORBERT C. RUBIN.